US012488502B2

(12) United States Patent
Luo et al.

(10) Patent No.: US 12,488,502 B2
(45) Date of Patent: Dec. 2, 2025

(54) METHODS AND SYSTEMS FOR CAMERA CALIBRATION BASED ON APPARENT MOVEMENT OF IMAGE CONTENT AT A SCENE

(71) Applicant: Verizon Patent and Licensing Inc., Basking Ridge, NJ (US)

(72) Inventors: Liang Luo, Nutley, NJ (US); Igor Gomon, Budd Lake, NJ (US); Lonnie Souder, Dorothy, NJ (US); Vidhya Seran, Irving, TX (US); Timothy Atchley, Burke, VA (US); Elena Dotsenko, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 500 days.

(21) Appl. No.: 17/715,644

(22) Filed: Apr. 7, 2022

(65) Prior Publication Data
US 2023/0326075 A1    Oct. 12, 2023

(51) Int. Cl.
*G06T 7/80* (2017.01)
*G06T 7/292* (2017.01)
*G06T 7/60* (2017.01)

(52) U.S. Cl.
CPC .............. *G06T 7/80* (2017.01); *G06T 7/292* (2017.01); *G06T 7/60* (2013.01); *G06T 2207/10016* (2013.01)

(58) Field of Classification Search
None
See application file for complete search history.

(56) References Cited

U.S. PATENT DOCUMENTS 10,733,761 B2 * 8/2020 Kroeger .................... G06T 7/85
10,827,116 B1 * 11/2020 Terven .................. G06V 20/52
(Continued)

FOREIGN PATENT DOCUMENTS

KR    20050061115 A   *  6/2005

OTHER PUBLICATIONS

J. L. Schönberger and J. - M. Frahm, "Structure-from-Motion Revisited," 2016 IEEE Conference on Computer Vision and Pattern Recognition (CVPR), Las Vegas, Nv, USA, 2016, pp. 4104-4113, doi: 10.1109/CVPR.2016.445. (Year: 2016).*

(Continued)

*Primary Examiner* — Siamak Harandi
*Assistant Examiner* — Caroline Tabancay Duffy

(57) ABSTRACT

An illustrative camera calibration system accesses a set of images captured by one or more cameras at a scene. The set of images may each depict a same element of image content present at the scene, but may depict the element of image content differently in each image so as to show an apparent movement of the element from one image to another. The camera calibration system applies a structure-from-motion algorithm to the set of images to generate calibration parameters for the one or more cameras based on the apparent movement of the element of image content shown in the set of images. Additionally, the camera calibration system provides the calibration parameters for the one or more cameras to a 3D modeling system configured to model the scene based on the set of images. Corresponding methods and systems are also disclosed.

18 Claims, 10 Drawing Sheets

(56) References Cited

U.S. PATENT DOCUMENTS

| | | | |
|---|---|---|---|
| 11,481,925 B1* | 10/2022 | Li | G06T 7/75 |
| 2010/0045701 A1* | 2/2010 | Scott | G06T 7/80 |
| | | | 348/135 |
| 2020/0074658 A1* | 3/2020 | Yu | G06T 7/557 |
| 2020/0126257 A1* | 4/2020 | Tauber | G06T 7/75 |
| 2020/0195904 A1* | 6/2020 | Tauber | H04N 13/156 |
| 2021/0044787 A1* | 2/2021 | Matsunobu | H04N 13/25 |
| 2022/0295040 A1* | 9/2022 | Jayaram | G06T 7/73 |

OTHER PUBLICATIONS

M. S. Alam, et al. "A Comparative Analysis of Feature Extraction Algorithms for Augmented Reality Applications," 2021 IEEE 7th International Conference on Smart Instrumentation, Measurement and Applications (ICSIMA), Bandung, Indonesia, 2021, pp. 59-63 . doi: 10.1109/ICSIMA50015.2021.9526295. (Year: 2021).*

\* cited by examiner

METHODS AND SYSTEMS FOR CAMERA CALIBRATION BASED ON APPARENT MOVEMENT OF IMAGE CONTENT AT A SCENE

BACKGROUND INFORMATION

Cameras are used to capture still images and/or video footage that may be presented to viewers directly and/or may be further analyzed and processed for a variety of entertainment, educational, industrial, commercial, vocational, promotional, and/or other applications and use cases. As one example, three-dimensional (3D) models of objects may be generated based on images and/or video captured by cameras having multiple different vantage points around the objects. Such models may be integrated with real or virtual scenes to provide extended reality experiences (e.g., augmented reality experiences, virtual reality experiences, etc.) and/or to produce graphical content for social networking applications, video games, film special effects, or the like. As another example, computer vision may be performed to extract information about objects captured in the images and to implement autonomous processes based on this information. In still other examples, camera-captured imagery and/or 3D modeling may be used for applications including, without limitation, product assembly, 3D vision inspection (e.g., goods inspection), human-computer interfaces, video surveillance (e.g., security surveillance, etc.), sports broadcasting (e.g., instant 3D replays, etc.), navigation (e.g., self-driving vehicles, etc.), industrial robotic control, and so forth.

For any of these or other applications or use cases, camera calibration with respect to the cameras capturing the images may be performed to facilitate optimal functionality of these image processing applications. Accurate camera calibration may eliminate various types of performance and quality issues that might otherwise arise with cameras that are not well-calibrated. As a result, 3D models and graphics generated based on images captured by well-calibrated cameras may represent subjects in a realistic and true-to-life manner to result in realistic, lifelike, immersive, and enjoyable experiences for users viewing and experiencing the models and graphics.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
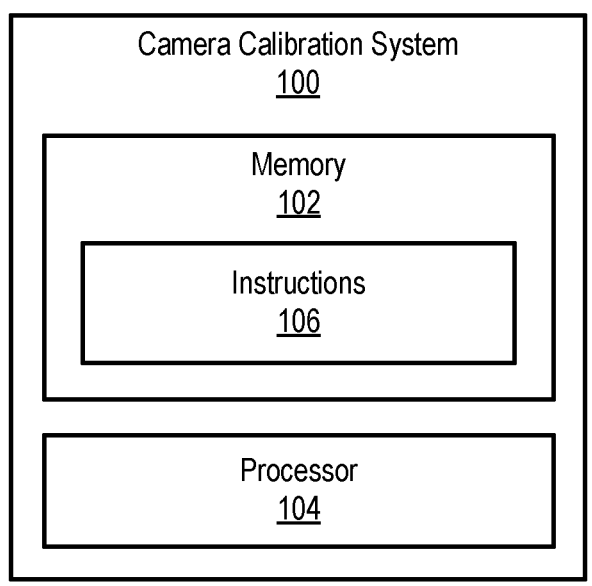
FIG. 1 shows an illustrative camera calibration system for camera calibration based on apparent movement of image content at a scene.

Methods and systems for camera calibration based on apparent movement of image content at a scene are described herein. As mentioned above, camera calibration may be performed with respect to one or more cameras to facilitate optimal functionality of various image processing applications, to eliminate performance and quality issues, and so forth. For example, proper camera calibration may help mitigate or correct for lens distortion and/or other unwanted artifacts of image capture, may estimate scene and/or object geometries (e.g., to align imagery of a scene captured from cameras having different vantage points), and/or may otherwise facilitate optimal use of image data captured by the cameras for various applications (e.g., generating models, performing computer vision operations, etc.). In some examples, camera calibration may involve determining (e.g., estimating) intrinsic parameters of a camera's internal characteristics such as focal length, skew, distortion, image center, and so forth. Additionally or alternatively, camera calibration may involve determining extrinsic parameters associated with a camera's position and/or orientation with respect to a scene and/or with respect to other cameras. For instance, camera calibration may involve scene registration for a set of cameras collectively capturing a scene to ensure that each camera shares a common world coordinate system so that the same features captured by different cameras are properly identified as the same features and can be aligned in the world coordinate space.

Conventionally, camera calibration may be performed based on target objects that are present at the scene (e.g., specifically positioned in view of the cameras) during a designated time period prior to operation of the image capture system for its intended use. For example, an image capture system including a set of cameras disposed at different locations surrounding a scene may be calibrated, prior to performing normal capture operations, by undergoing an offline calibration procedure involving a target object that has particular characteristics that facilitate the calibration process.

As one example, a dedicated calibration object specifically designed for use as a target object for camera calibration may be used by placing and/or moving around the target object within the scene to facilitate calibration prior to normal operation of an image capture system. A dedicated calibration object may be implemented by, for example, a chessboard object or another object featuring predefined and readily recognizable features (e.g., corners between black and white squares on the chessboard, QR codes, ArUco or ChArUco patterns, barcodes, etc.). Typically, such dedicated calibration objects would only be present in the scene during the dedicated calibration procedure (prior to normal operation of the capture system) and would be removed during normal operation when other objects (e.g., people, props, etc.) are introduced into the scene.

As another example, camera calibration systems may access machine learning models for certain types of target objects that happen to be present at the scene naturally, rather than being brought on as dedicated calibration objects solely for calibration purposes. Based on training images and machine learning technology, such machine learning models may allow a camera calibration system to gain a deep understanding of a certain type of target object (e.g., the human body) and the poses possible or common for this type of object. Based on these insights and captured images depicting target objects of such pre-modeled object types, a camera calibration system may determine calibration parameters during a dedicated calibration procedure prior to normal operation or may even determine such parameters during normal operation as target object instances are recognized as being present in the scene that is being observed and recorded by the image capture system.

In all of these examples, calibration is made possible by the presence of particular target objects for which the camera calibration system has some type of model or understanding. Whether managing the camera calibration (e.g., initializing and/or revising calibration parameters) based on dedicated and specially-designed calibration objects (e.g., chessboards, QR codes, etc.) or based on more ordinary objects for which machine learning models are available (e.g., people, props, furniture, etc.), all of the calibration approaches described above rely on the presence of certain types of target objects and a requisite degree of system recognition/understanding of such target objects. In contrast, methods and systems described herein for camera calibration are based on apparent movement of image content at a scene and may be performed in "non-target" conditions. That is, camera calibration techniques described herein may be performed automatically, prior to or during normal operation of the image capture system, with or without any pre-modeled or recognized target objects being present.

More particularly, camera calibration techniques described herein may be performed based on apparent movement of image content at a scene, regardless of whether the image content includes recognized or pre-modeled objects or, indeed, includes any objects at all beyond structures and scenery inherent to the scene (e.g., the ground, the walls, the ceiling, the sky, permanent fixtures present at the scene, etc.). As described in more detail below, "image content", as used herein, may refer to any objects, scenery, visual structures, and/or other content that may be depicted in an image captured of a scene. For example, for an image of an indoor basketball stadium (an example that will be described in more detail below), various elements of the image content may include anything present in the stadium so as to be depicted in the image, including, for instance, the floor of the basketball court, the lines painted on the floor, the basketball standards (backboards, rims, nets, etc.), the players and referees moving about on the court, the basketball the game is being played with, seats and fixtures of spectators viewing the game, spectators themselves (if present), walls and ceiling fixtures of the stadium, and so forth.

For each of these and/or other elements of image content depicted in a set of images, an "apparent movement" may refer to either a real movement or a virtual movement of any element of image content from one image to another. For instance, as will be illustrated in more detail below, real movements of an object such as a basketball may provide an apparent movement for image frames captured at sequential moments in time as the basketball moves in time. Similarly, real movements of a camera itself may cause objects that are static with respect to the scene (e.g., a basketball backboard, etc.) to appear to move from frame to frame as the camera viewpoint moves in time. Another type of apparent movement represented in certain sets of images may involve what is referred to herein as virtual movement rather than (or in addition to) real movement such as described above. Virtual movement of an object or other element of image content refers to the way an object may appear to "move" from image to image when such images are captured from different vantage points, even if all the images are captured at a same particular moment in time (i.e., such that real movement in time of either the image content or the camera is irrelevant).

Based on any of these types of apparent movement, systems and methods may apply structure-from-motion algorithms described herein. In this way, calibration parameters may be determined based on the apparent movements of the image content even in non-target conditions. This is because structure-from-motion algorithms described herein do not rely on any preexisting knowledge or understanding of any particular object, but, rather, analyze the apparent movements of any objects that happen to be present at the scene (e.g., including other cameras present at the scene, fixtures associated with the scene such as light fixtures or statically mounted seating in a stadium, etc.), whether or not these types of objects are recognizable to, or have been pre-modeled by, the system (as may be required for calibration techniques involving a dedicated calibration target such as a chessboard or a pre-modeled object such as a human body or face). Moreover, structure-from-motion algorithms described herein do not necessarily require that any discrete target object be depicted within image content per se as long as depicted visual structures appear to move from image to image. For instance, calibration may be performed based on visual structures not necessarily associated with any discrete objects (e.g., structures such as the painted lines on a basketball court, features on the walls or ceilings of an indoor scene, clouds in the sky, background scenery such as trees or buildings outside of the scene being captured, etc.), as long as these visual structures are depicted to have apparent movements (e.g., real movements and/or virtual movements) from image to image.

Methods and systems described herein for camera calibration based on apparent movement of image content at a scene may provide various advantages and benefits. For example, since calibration management can be performed without any particular target object, one advantage is that cameras may be set up and automatically calibrated regardless of what type of image content is to be captured and without the inconvenience of having to put certain objects in front of the cameras for calibration purposes. Similarly, another advantage of methods and systems described herein is that calibration operations may be performed in an intra-capture manner. That is, rather than being performed during a dedicated calibration stage prior to normal operation, intra-capture camera calibration may be performed during normal operation of a system (e.g., as a volumetric capture system captures imagery depicting ordinary objects to be modeled, as volumetric models of various objects including the object used for calibration are generated and maintained, etc.). In this manner, camera calibration may be initialized without the inconvenience of a dedicated calibration session. Moreover, as events occur during operation that may affect the calibration of the cameras (e.g., if cameras are moved or accidentally bumped so as to change position, if the lighting of the scene changes, if objects move to areas of the scene for which the camera calibration has not yet been optimized, if thermal changes in the environment have an effect on the cameras, etc.), methods and systems described herein may automatically and immediately respond to these events by fixing, updating, improving, and/or otherwise continuing to manage the camera calibration without needing to put scene capture or modeling on hold to return to the dedicated calibration stage.

Another advantage of implementing camera calibration based on apparent movement of image content at a scene, as described herein, is that leveraging all types of image content—including image content that is not necessarily recognized, pre-modeled, or otherwise understood by the system prior to calibration—may lead to more and better opportunities for cameras to be calibrated and aligned with respect to global and more localized dimensions. For example, as various types of image content engage in different types of apparent movement while being captured by one or more cameras, intrinsic and/or extrinsic parameters for these cameras may be initialized and continuously refined. In this way, not only can highly accurate global calibration parameters be determined, but local calibration parameters may be continuously fine-tuned to further improve the camera calibration for each of the cameras capturing the scene. By relying on higher dimensional data (e.g., rather than single pixel data such as presented with a dedicated chessboard object or the like), systems may derive more information about the world coordinate system and may thereby enhance the scene alignment aspects of the camera calibration. Moreover, certain issues that commonly arise with dedicated calibration objects (e.g., lighting issues related to glare obscuring a chessboard pattern of a dedicated calibration object, etc.) may naturally be resolved when other elements of image content at the scene (including other types of discrete objects and/or visual structures not necessarily associated with discrete objects) are used for camera calibration.

Yet another benefit of methods and systems described herein for camera calibration based on apparent movement of image content may arise for scenes that are so large as to make it a challenge for any object to serve the purpose of a conventional calibration target object. For example, if cameras are placed around a large arena (e.g., a basketball or football stadium, etc.) to capture a sporting event or other type of event at the arena (e.g., a concert, etc.), target objects such as chessboards or human bodies may be of limited use as calibration targets due to their relatively small size in comparison to the size of the scene that is to be captured (e.g., the entire basketball court or football field, etc.). Accordingly, calibration management operations that can be performed based on larger objects and/or visual structures such as the lines painted on the court or field, the basketball standards or field goal posts, the patterns of aisles and seating in the spectator areas of the arena, and so forth, may provide a great benefit in these situations. For example, the ability to use such large objects and/or visual structures may facilitate effective calibration of cameras placed relatively far apart from one another and/or far away from the capture area (e.g., in order to capture a wide view) based on apparent movements of elements of image content that are readily identifiable from the vantage points of many or all of the cameras.

Various specific implementations will now be described in detail with reference to the figures. It will be understood that specific implementations described below are provided as non-limiting examples and may be applied in various situations. Additionally, it will be understood that other examples not explicitly described herein may also be captured by the scope of the claims set forth below. Methods and systems described herein for camera calibration based on apparent movement of image content at a scene may provide any of the benefits mentioned above, as well as various additional and/or alternative benefits that will be described and/or made apparent below.

FIG. 1 shows an illustrative camera calibration system 100 ("system 100") for camera calibration based on apparent movement of image content at a scene. System 100 may be implemented by computer resources such as processors, memory devices, storage devices, communication interfaces, and so forth. For example, system 100 may be implemented by local computing systems operated by an end user who consumes graphical content that is generated based on calibration operations performed by system 100, by server systems operating remotely from the end user such as distributed computing systems operated by a communications provider (e.g., multi-access edge computing (MEC) servers) or distributed computing systems operated by a cloud-computing provider (e.g., multi-access cloud servers), and/or by any other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with camera calibration based on apparent movement of image content at a scene in accordance with methods and systems described herein and/or as may serve a particular implementation.

Figure 2:
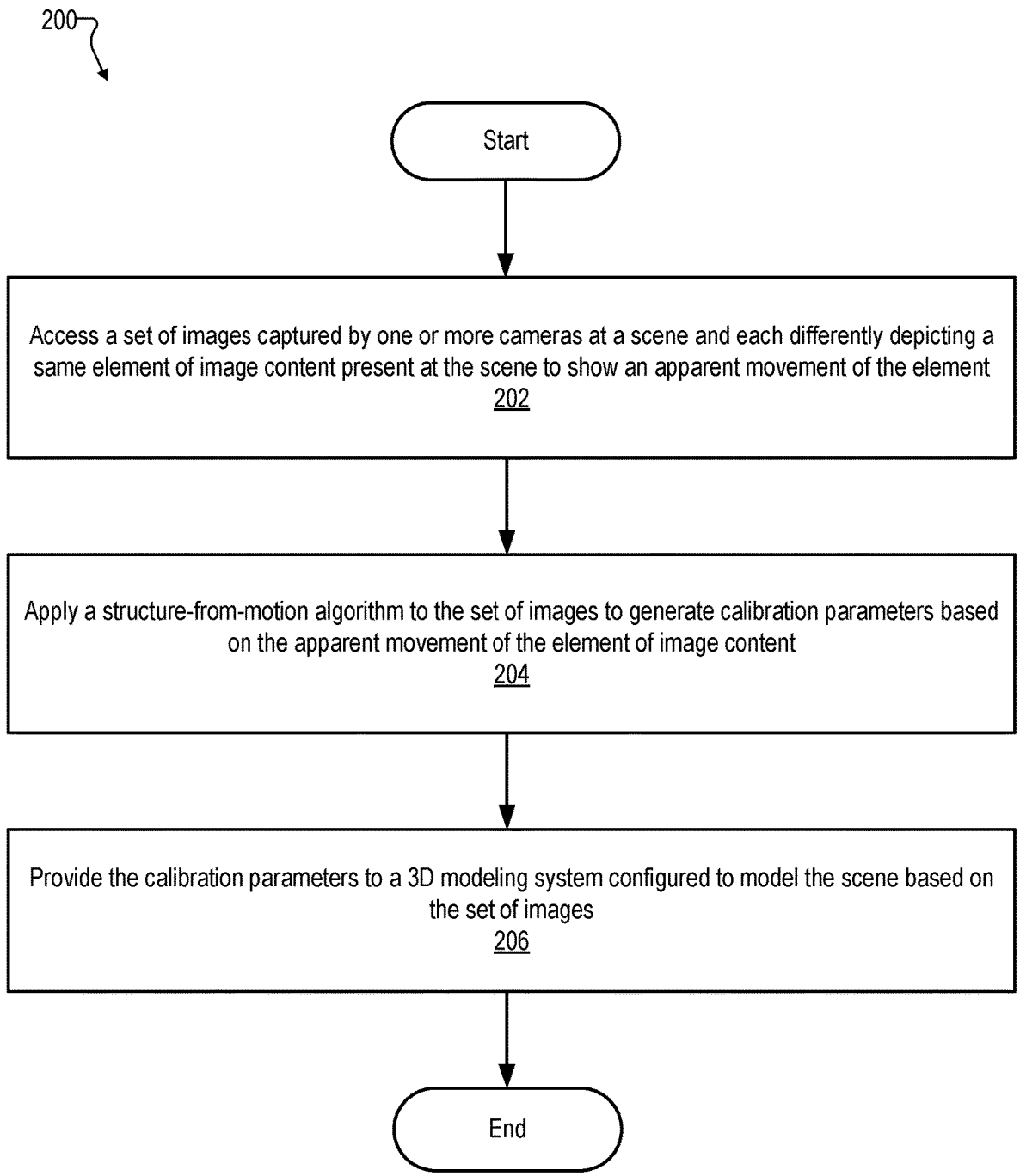
FIG. 2 shows an illustrative method for camera calibration based on apparent movement of image content at a scene.

As one example of functionality that processor 104 may perform, FIG. 2 shows an illustrative method 200 for camera calibration based on apparent movement of image content at a scene. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a camera calibration system such as system 100 and/or any implementation thereof.

In certain examples, calibration operations of method 200 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Along with being performed in either a time-shifted manner (calibrating cameras prior to using the cameras to capture image data for a scene) or a real time manner (as described above), it will also be understood that the calibration operations of method 200 may be performed during a dedicated calibration phase (e.g., when the image capture system is in a calibration mode prior to switching over to a normal mode of operation in which image content is captured for any of the various use cases that have been described) and/or concurrently with normal operations in an intra-capture implementation. As used herein, operations described as being performed "intra-capture" by an implementation of system 100 will be understood to be performed during normal operation of an image processing system, rather than, for example, being performed during a special operating mode of the system when normal operation is suspended or has not yet begun. For example, for an image processing system configured to perform volumetric modeling of a scene captured by cameras having vantage points at various locations around the scene, normal operation may be performed while objects of interest (e.g., objects that are to be modeled) are present at the scene, while scene imagery is being acquired (e.g., captured by the cameras), and/or while volumetric models of the objects are being generated and maintained based on the acquired image data. In contrast, special operation for this type of system may refer to a dedicated pre-acquisition calibration-only mode within which the system may operate prior to objects of interest being introduced into the scene and/or modeled by the system. For instance, when an image processing system operates in a dedicated calibration mode, objects present at the scene and/or analyzed during processing may be limited to dedicated calibration objects (e.g., chessboard target objects, etc.) that are not volumetrically modeled and will be removed prior to normal operation of the system. In certain implementations, calibration may take place both in a dedicated pre-acquisition calibration-only mode of operation (e.g., to initialize the calibration parameters) and may continue in an intra-capture manner as normal operations begin (e.g., to continuously refine and update the calibration parameters).

Each of operations 202-206 of method 200 will now be described in more detail as the operations may be performed by an implementation of system 100 (e.g., by processor 104 executing instructions 106 stored in memory 102).

At operation 202, system 100 may access a set of images captured by one or more cameras at a scene. For instance, in one example, a single camera may be integrated with a user device (e.g., a camera of a smartphone, etc.) and the camera may capture video consisting of a sequence of image frames that implement the set of images accessed by system 100 at operation 202 (e.g., an implementation of system 100 implemented by the smartphone and/or by another computing device). In another example, a plurality of cameras may be placed at various locations around a scene (e.g., a playing field in a sporting venue, etc.) to capture image content at the scene. In this example, the set of images accessed by system 100 at operation 202 may include video frames captured at different times similar to the video described above and/or may include frames captured at the same (or different times) from different cameras having different vantage points of the scene.

In either of these examples (or other suitable examples of one or more cameras capturing image data), the set of images captured by the one or more cameras may each depict a same element of image content present at the scene. This element of image content may be depicted differently in each image of the set of images so as to show an apparent movement of the element from one image to another. For example, the element of image content may be an object that is moving in time (e.g., a person walking through the scene) and that is depicted in slightly different ways from frame to frame of video being captured of the scene by any particular camera. As another example, the element of image content may involve a visual structure present at the scene (e.g., a pattern on the floor or walls of the room) that is depicted in slightly different ways from image to image being captured by different cameras from different vantage points. Whether apparent movements result from real movement of objects, real movement of cameras, or virtual movements (when different cameras at different vantage points capture images of stationary or moving image content), a set of images captured by the one or more cameras may all depict one or more elements of image content in a way that appears to move from image to image such that structure-from-motion algorithms described herein can be applied.

At operation 204, system 100 may apply a structure-from-motion algorithm to the set of images accessed at operation 202. Based on this application of the structure-from-motion algorithm, system 100 may generate calibration parameters for the one or more cameras based on the apparent movement of the element of image content shown in the set of images. For example, as will be described in more detail below, the structure-from-motion algorithm may involve identifying corresponding features between images, determining geometric relationships between different cameras (in examples that involve more than one camera) based on the corresponding features captured by the different cameras, constructing a scene registration based on the geometric relationships, and iteratively adjusting and updating the scene registration as additional sets of images are captured and processed. The scene registration may define various characteristics of cameras being used to capture the image, including intrinsic characteristics of each camera and pose characteristics of the cameras in relation to one another and/or to a world coordinate system that all of the cameras share in common. As such, various calibration parameters including intrinsic and extrinsic parameters for each of the cameras may be generated, refined, updated, and/or otherwise managed based on the scene registration that is produced using the structure-from-motion algorithm and one or more sets of images to which the algorithm is applied.

At operation 206, system 100 may provide the calibration parameters generated for the one or more cameras at operation 204 to be used in further image processing and/or camera calibration operations. For instance, as will be described in more detail below, the calibration parameters may be provided to a 3D modeling system configured to model the scene based on the set of images. This 3D modeling system may generate volumetric models efficiently and accurately when images are captured by well-calibrated cameras. In other implementations, calibration parameters may be provided to other types of systems that similarly use accurate and continuously up-to-date calibration parameters for other types of use cases other than 3D modeling of the scene.

Figure 3:
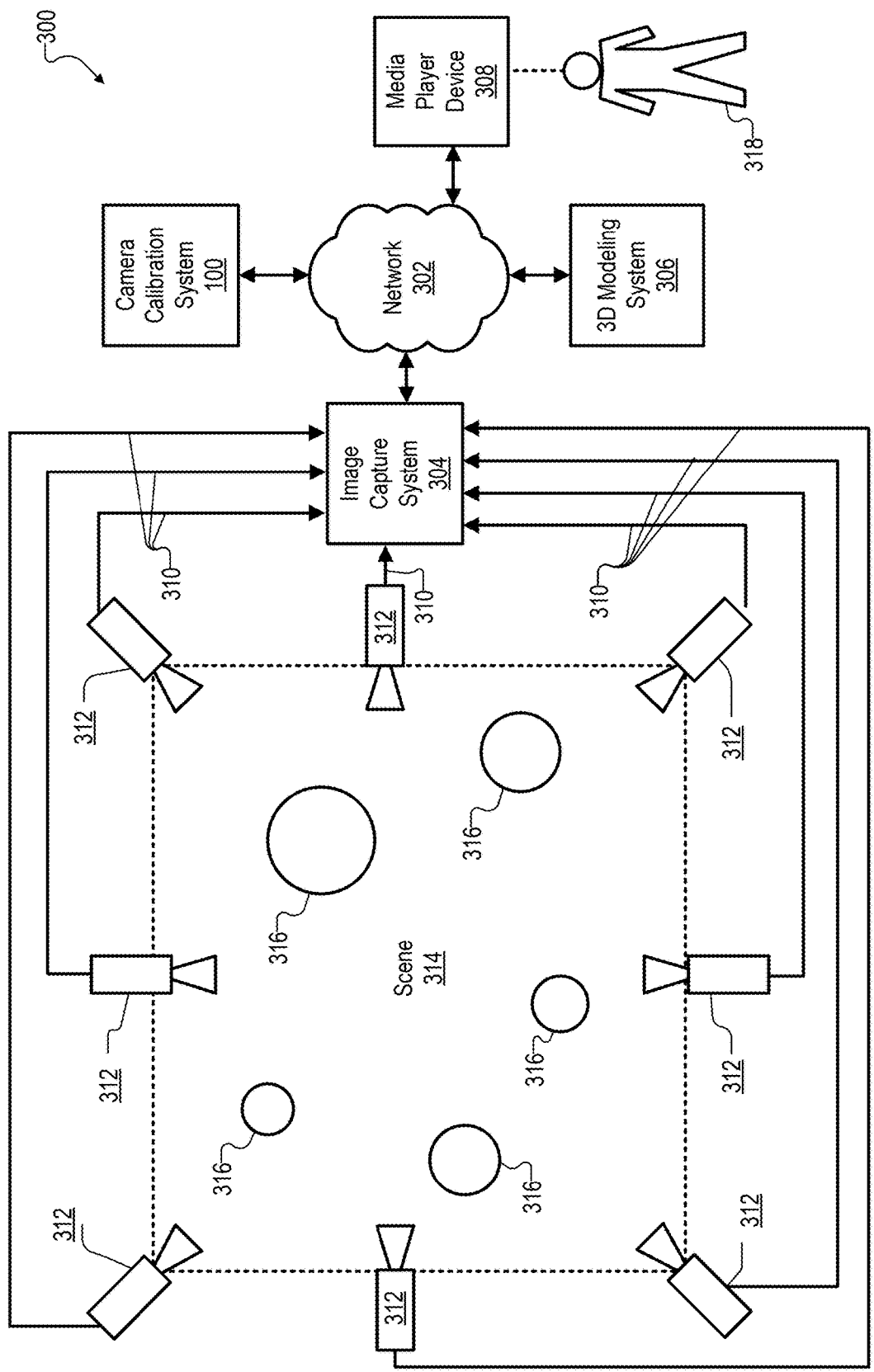
FIG. 3 shows an illustrative configuration in which a camera calibration system may be deployed.

FIG. 3 shows an illustrative configuration 300 in which a camera calibration system may be deployed. As shown, an implementation of system 100 is communicatively coupled, by way of a network 302, with an image capture system 304, a 3D modeling system 306, and a media player device 308. Image capture system 304 is shown to receive image data 310 from a plurality of cameras 312 that are placed at a scene 314 at different locations so as to have different vantage points as imagery of objects 316 and/or other visual structures at scene 314 are captured. A user 318 is shown to use media player device 308 to view and/or otherwise experience media content that is generated by 3D modeling system 306 based on image data 310, which may be captured by image capture system 304 as calibrated by system 100. Each of the elements of configuration 300 will now be described in more detail.

Network 302 may represent any computer networks and/or other communicative interchanges by way of which various systems and devices of configuration 300 communicate with one another. Specifically, as shown, system 100, image capture system 304, 3D modeling system 306, and media player device 308 may all intercommunicate by way of any of various network elements represented by network 302 in FIG. 3. To this end, network 302 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 302 may include elements of various interconnected networks that are outside of any provider network and outside the control of any provider of such a provider network. Elements of the Internet, one or more local area networks, wide area networks, content delivery networks, and/or any other suitable networks may also be incorporated into network 302 in certain examples. Any of these provider or non-provider networks or network elements may provide data delivery between any of the systems or devices shown in configuration 300 (including cameras 312, though these are not explicitly shown to be communicatively coupled to network 302).

Image capture system 304 may be implemented by any computing system configured to receive and process image data 310 from cameras 312. For example, in an implementation involving multiple cameras such as illustrated in configuration 300, image capture system 304 may include or be implemented by a dedicated computing system (e.g., a computing system physically located at scene 314 with cameras 312 and configured to interoperate directly with cameras 312) and/or by one or more cloud servers, MEC servers, or other distributed server systems as may serve a particular implementation. In other types of configurations, image capture system 304 may be implemented in other ways or by other types of computing systems. For instance, in a configuration involving one or more cameras integrated into a smartphone or another such user device, image capture system 304 may be implemented (along with, in some examples, one or more of the other systems such as camera calibration system 100, 3D modeling system 306, and/or media player device 308) by computing resources of the smartphone or other user device.

Upon receiving image data 310 from one or more cameras 312, image capture system 304 may be configured to process or prepare the image data in certain ways (e.g., adding metadata to indicate, for each captured image, a timestamp when the image was captured and/or a camera that captured the image, etc.) and to provide the processed image data to system 100 to be analyzed in accordance with processes described herein (e.g., in accordance with method 200 or other operations of system 100 described herein). Image capture system 304 may also provide images (e.g., processed image data 310, etc.) to 3D modeling system 306 to be used, in the example of configuration 300, for generating volumetric models for graphical content to be presented to user 318 by media player device 308. Additionally or alternatively, image capture system 304 may provide images to other types of systems that may perform further image processing and/or rendering operations on the images as may serve another type of application or use case described herein (e.g., including use cases that do not necessarily involve 3D modeling). While system 100 may provide calibration parameters to such systems (e.g., 3D modeling system 306, etc.) directly (e.g., transmitting the parameters to 3D modeling system 306 by way of network 302), it will be understood that another (indirect) way system 100 may provide calibration parameters to a system such as 3D modeling system 306 is to provide the calibration parameters to image capture system 304, and for image capture system 304 to account for the parameters (e.g., by correcting distortion in the images before sending them to 3D modeling system 306) and/or to transmit the calibration parameters together with the image data to 3D modeling system 306.

Cameras 312 may capture color data (e.g., red-green-blue (RGB) data, etc.), grayscale data, depth data, and/or any combination of these or other suitable types of image data representative of objects 316 and/or other visual content within scene 314. To this end, cameras 312 may be implemented as two-dimensional (2D) capture devices (e.g., video cameras, still cameras, etc.) configured to generate 2D image data 310 depicting image content from the respective vantage points of cameras 312, depth capture devices (e.g., time of flight depth capture devices, stereoscopic depth capture devices, etc.) that scan objects 316 from the respective vantage points of cameras 312 to determine spatial properties of the surfaces of objects 316 in 3D space, and/or any other suitable types of cameras. In examples where cameras 312 capture both color and depth data, the resultant data provided to system 100 may be referred to as RGBD data or surface data.

Image data 310 provided by each camera 312 may represent one or more images (e.g., standalone 2D images, frames of 2D video images, etc.) that have been captured and/or otherwise generated by cameras 312. This data may be communicated to image capture system 304 in any suitable way. For example, image data 310 may be provided to image capture system 304 by way of direct communicative connections (not explicitly shown) and/or by way of network 302, which, as described above, may implement and/or employ any suitable communication technologies, devices, media, protocols, or the like as may serve a particular implementation.

Scene 314 may represent any type of scene described herein or as may serve a particular implementation. For example, scene 314 may be a relatively small scene (e.g., a small room of an object modeling studio, etc.) or a relatively large scene (e.g., a large stadium or outdoor amphitheater, etc.). Scene 314 may be indoors or outdoors, and may be well defined as a specific area (e.g., the space within a boxing ring) or a more loosely defined general area (e.g., such as an outdoor landscape that stretches off in many directions). In certain examples, scene 314 may be associated with an event venue that includes a stage area where activities associated with an event are performed (e.g., a playing field or court of a sports venue where sporting events are held; a stage area where plays, music concerts, or other such entertainment are performed, etc.).

Objects 316 are depicted as differently-sized circles in FIG. 3, but will be understood to represent any of various elements of image content that may be present at scene 314 and that may be depicted in image data 310 captured by cameras 312. In certain examples, objects 316 may represent discrete objects such as living human or animal subjects that move with respect to scene 314, props or equipment worn or carried by such humans or animal subjects, objects used by the human or animal subjects (e.g., vehicles, furnishings, etc.), or other types of objects as may be present at scene 314. Other types of objects 316 may be integrated into scene 314 in a more static way than the discrete objects described above. For example, if scene 314 is associated with an event venue that includes a stage area where activities associated with events are performed, certain objects 316 may be implemented as objects or visual structures within the event venue that are stationary with respect to the stage area as the activities associated with the event are performed. Examples of such static objects in an event venue such as a basketball stadium may include static basketball standards (backboards, rims, nets, etc.), tables and chairs along the sidelines that remain relatively static even as a basketball game involving moving players is ongoing, spectator seating that includes seats permanently bolted down to the floor of the venue, and so forth. Additionally, other visual structures that may not be considered discrete objects may also be present at the scene and may be useful to analyze using the structure-from-motion algorithms described herein. Examples of such visual structures for this stadium example may include lines painted on the basketball court, advertisements displayed in various parts of the stadium, and so forth.

In this specific basketball stadium example and many other examples, the objects 316 present at scene 314 may be relatively numerous, providing many potential datapoints (e.g., elements of image content depicted in multiple images) for system 100 to analyze in the calibration operations described herein. Whether implemented by discrete objects that actually move, static objects that are stationary with respect to the scene, or static visual structures that do not move relative to the scene, any of these types of objects 316 may undergo apparent movements with respect to cameras 312 (which themselves may move) and/or the respective vantage points from which different image data is captured (which help provide images with virtual movements even if the cameras are also static with respect to the scene). As such, any of the discrete objects or other visual content implementing objects 316 in FIG. 3 may serve as a calibration target for system 100 when undergoing an apparent movement to which a structure-from-motion algorithm may be applied.

3D modeling system 306 may be configured to generate model data based on image data (e.g., a raw or processed version of image data 310) received from image capture system 304 and based on calibration parameters that allow 3D modeling system 306 to properly correct and/or align image data received from image capture system 304 to the extent that it has not already been done. 3D modeling system 306 may generate model data representative, for example, of one or more models (e.g., volumetric models) of one or more of objects 316 depicted in the images. To volumetrically model a particular object 316, 3D modeling system 306 may use several images captured synchronously from several different vantage points (e.g., provided by several different cameras 312) for each frame of the model. Then, as time proceeds forward, 3D modeling system 306 may use additional sets of synchronous images to update the model as the object changes pose (e.g., changes form, moves to a different location, turns to a different orientation, etc.) within scene 314. Accordingly, modeling system 306 may make use both of images captured by the same camera 312 at different times and of images captured by different cameras 312 at the same time.

It will be understood, as mentioned above, that any or all of the same image data 310 used by 3D modeling system 306 may also be employed by system 100 to perform camera calibration based on apparent movement of image content at the scene in the ways described herein. Additionally, it will be understood that 3D modeling is just one example of an application or use case for which image data captured by image capture system 304 may be used. As has been mentioned, various other applications and use cases (which may or may not involve 3D modeling) may similarly be implemented to use the captured image data. These may include extended reality (e.g., virtual reality, augmented reality, mixed reality, etc.), product assembly, 3D vision inspection (e.g., goods inspection), human-computer interfaces, video surveillance (e.g., security surveillance, etc.), sports broadcasting (e.g., instant 3D replays, etc.), navigation (e.g., self-driving vehicles, etc.), industrial robotic control, and various other applications and use cases.

Graphical content (e.g., 3D models and/or other processed graphics data) may be generated based on calibration parameters determined and provided to 3D modeling system 306 by system 100 in any of the ways described herein. For example, 3D modeling system 306 may correct distortion and/or other camera-specific characteristics of image data received from image capture system 304 based on intrinsic parameters provided by system 100. As another example, 3D modeling system 306 may align images captured from different vantage points based on extrinsic parameters provided by system 100.

Models of objects 316, once generated and while being updated and otherwise managed by 3D modeling system 306, may be provided for use in any application as may serve a particular implementation. For example, a volumetric model generated and continuously updated by 3D modeling system 306 may be provided (e.g., by way of network 302) to media player device 308 for presentation to user 318.

Media player device 308 may be implemented as any type of computing device used by user 318 to experience volumetric models and/or other graphical content generated by 3D modeling system 306 or any other image processing output provided in other (e.g., non-modeling) types of implementations. For example, if a volumetric model is to be presented as part of an extended reality experience (e.g., a virtual reality experience, an augmented reality experience, etc.) in which user 318 is engaged, media player device 308 may be implemented as an extended reality device (e.g., a head-mounted device) configured to present the extended reality experience. In the same or other examples, media player device 308 may be implemented as a general-purpose computing device (e.g., a mobile device such as a smartphone or tablet device, a personal computing device such as a laptop computer, etc.). Such a device may present an extended reality experience to user 318 that features volumetric models of objects 316 in certain examples. In other examples, such a device may present volumetric or other models in other suitable types of applications such as communications applications (e.g., a 3D video phone), engineering applications (e.g., a 3D computer-aided design application), or any other type of application that makes use of 2D or 3D object models.

Figure 4:
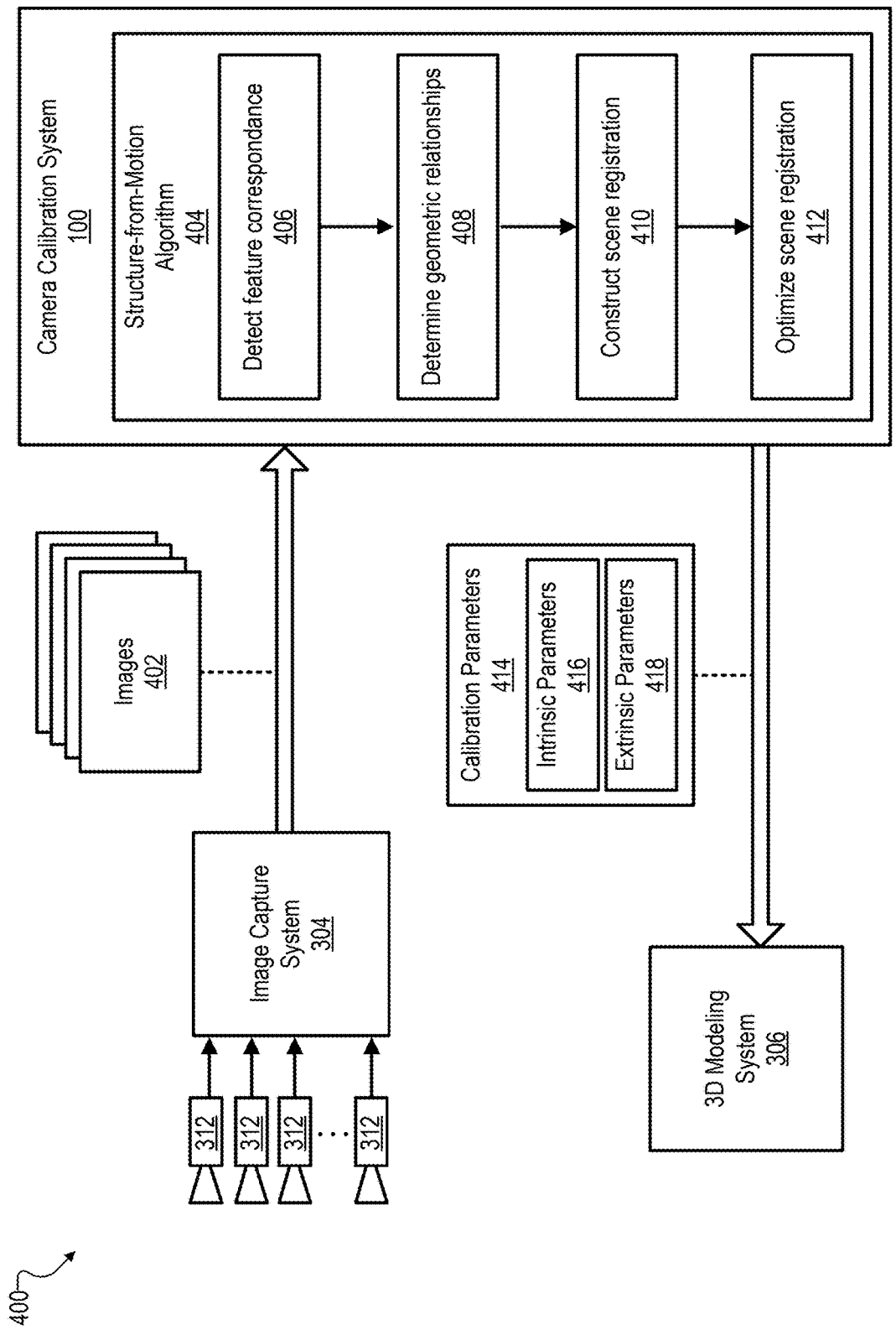
FIG. 4 shows an illustrative structure-from-motion algorithm that may be applied to a set of images to generate calibration parameters for one or more cameras.

To illustrate and describe in more detail how system 100 may perform method 200 in a configuration such as configuration 300, FIG. 4 shows an example implementation 400 in which an illustrative structure-from-motion algorithm may be applied to a set of images to generate calibration parameters for one or more cameras. As shown, certain elements of configuration 300 are illustrated in FIG. 4 with additional detail that will now be described in relation to FIG. 4 as well as FIGS. 5-9. Other elements of configuration 300 are omitted in FIG. 4 for the sake of clarity and simplicity, but it will be understood that these elements may play the same roles for implementation 400 as were described above with respect to configuration 300.

Implementation 400 in FIG. 4 shows cameras 312 providing image data to image capture system 304 in the ways described above. Image capture system 304 may provide the image data (along with, in certain examples, additional metadata that is associated with the image data) as a set of images 402 delivered to system 100. Examples of different sets of images implementing different types of apparent movements are described and illustrated in FIGS. 5-7. Upon receiving images 402 from image capture system 304, system 100 may apply a structure-from-motion algorithm 404 that is shown to be implemented within system 100. This algorithm includes various operations including an operation 406 involving detecting feature correspondence between images 402 in the set (as illustrated in more detail in FIG. 8), an operation 408 involving determining geometric relationships between cameras at different vantage points, an operation 410 involving constructing a scene registration, and an operation 412 involving optimizing the scene registration. Based on the application of structure-from-motion algorithm 404 to images 402, system 100 is shown to generate calibration parameters 414 that are directly or indirectly provided for use by 3D modeling system 306 (or another suitable image processing system). Calibration parameters 414 include intrinsic parameters 416 and extrinsic parameters 418 that are illustrated in more detail in FIG. 9.

The functionality of cameras 312, image capture system 304, and 3D modeling system 306 were described above in relation to FIG. 3. Various aspects of how system 100 may apply structure-from-motion algorithm 404 to images 402 to generate calibration parameters 414 will now be described with reference to FIGS. 4-9.

Images 402 shown in FIG. 4 may represent any suitable set of images that have been captured by image capture system 304 (e.g., by one or more cameras 312). For example, images 402 may include a set of images captured by one camera over a sequence of different times (e.g., a series of image frames of a video sequence captured over a period of time), a set of images captured at the same particular time by a plurality of cameras having different vantage points of a scene, or several series of image frames of different video sequences captured over a period of time by different cameras having different vantage points. In some examples, images 402 may represent a discrete set of images (e.g., accessed as a one-time event). Alternatively, images 402 may represent a stream of images being captured and transmitted to system 100 continuously (e.g., as bursts of synchronous image frames several times per second as the image frames are captured, as bursts of video sequences periodically every few minutes or every hour, etc.) and used to not only initialize calibration but also to refine and keep the calibration of cameras 312 up to date.

When accessed by (e.g., retrieved by, provided to, etc.) system 100, images 402 may be raw and unsequenced images captured from vantage points unknown to system 100. However, as will be illustrated in more detail, certain metadata may be available to system 100 including indicators of when an image 402 was captured and by which camera the image 402 was captured. Additionally, as has been mentioned, each image in the set may depict one or more elements of image content that are also depicted in one or more other images in the set, albeit depicted differently so as to show an apparent movement of the element from one image to another. On this basis, structure-from-motion algorithm 404 may allow system 100 to detect corresponding features and begin to determine geometric relationships between different images 402, eventually constructing a scene registration indicative of poses of different cameras with respect to the scene.

Figure 5:
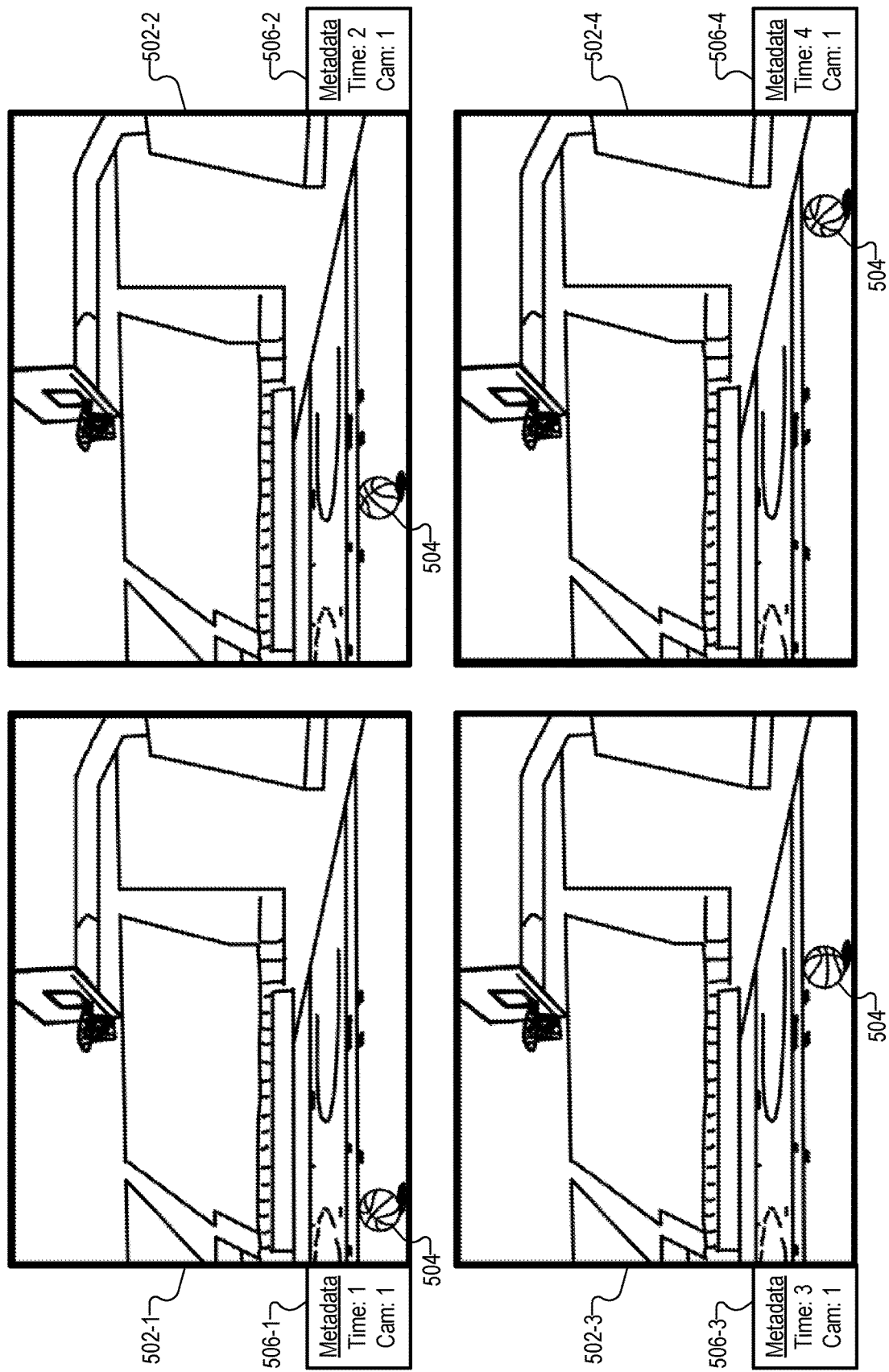
FIG. 5 shows an illustrative set of images depicting elements of image content including an object undergoing a real movement.
Figure 6:
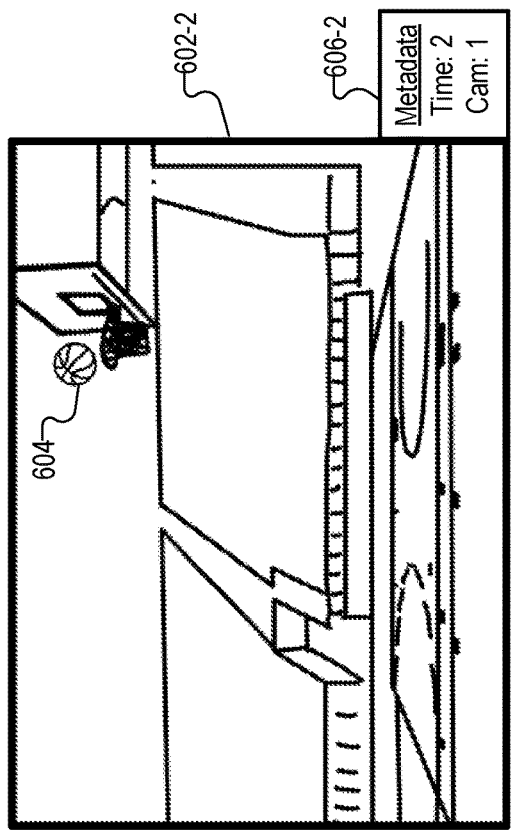
FIG. 6 shows an illustrative set of images captured by a single camera as the camera undergoes a real movement.
Figure 6:
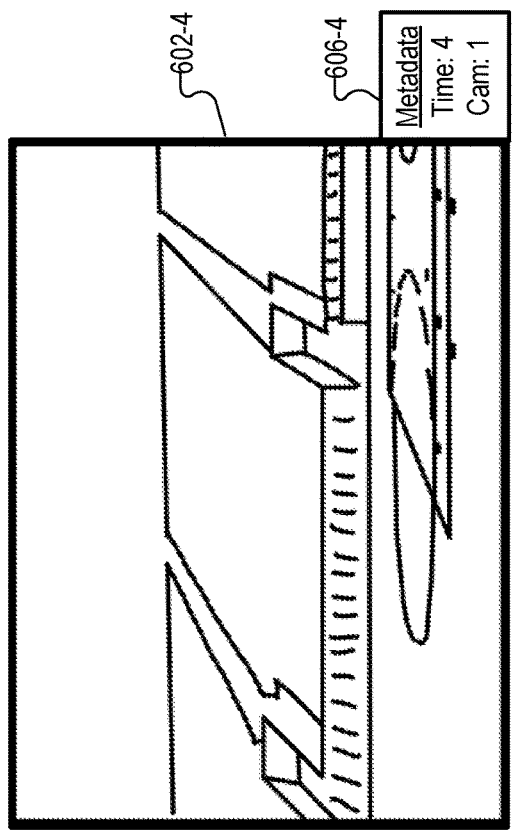
Figure 6:
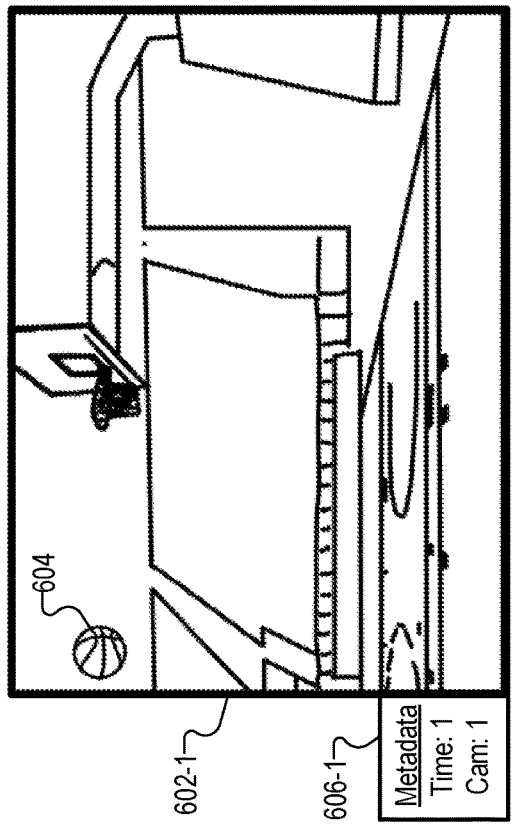
Figure 6:
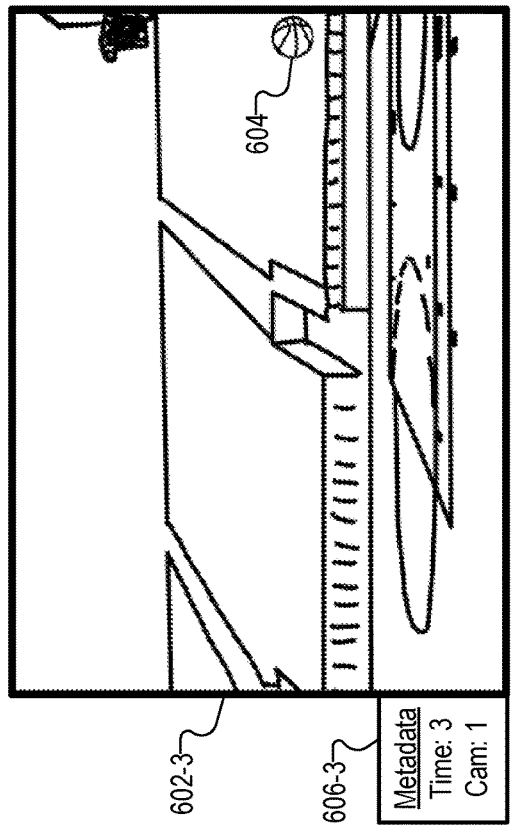
Figure 7:
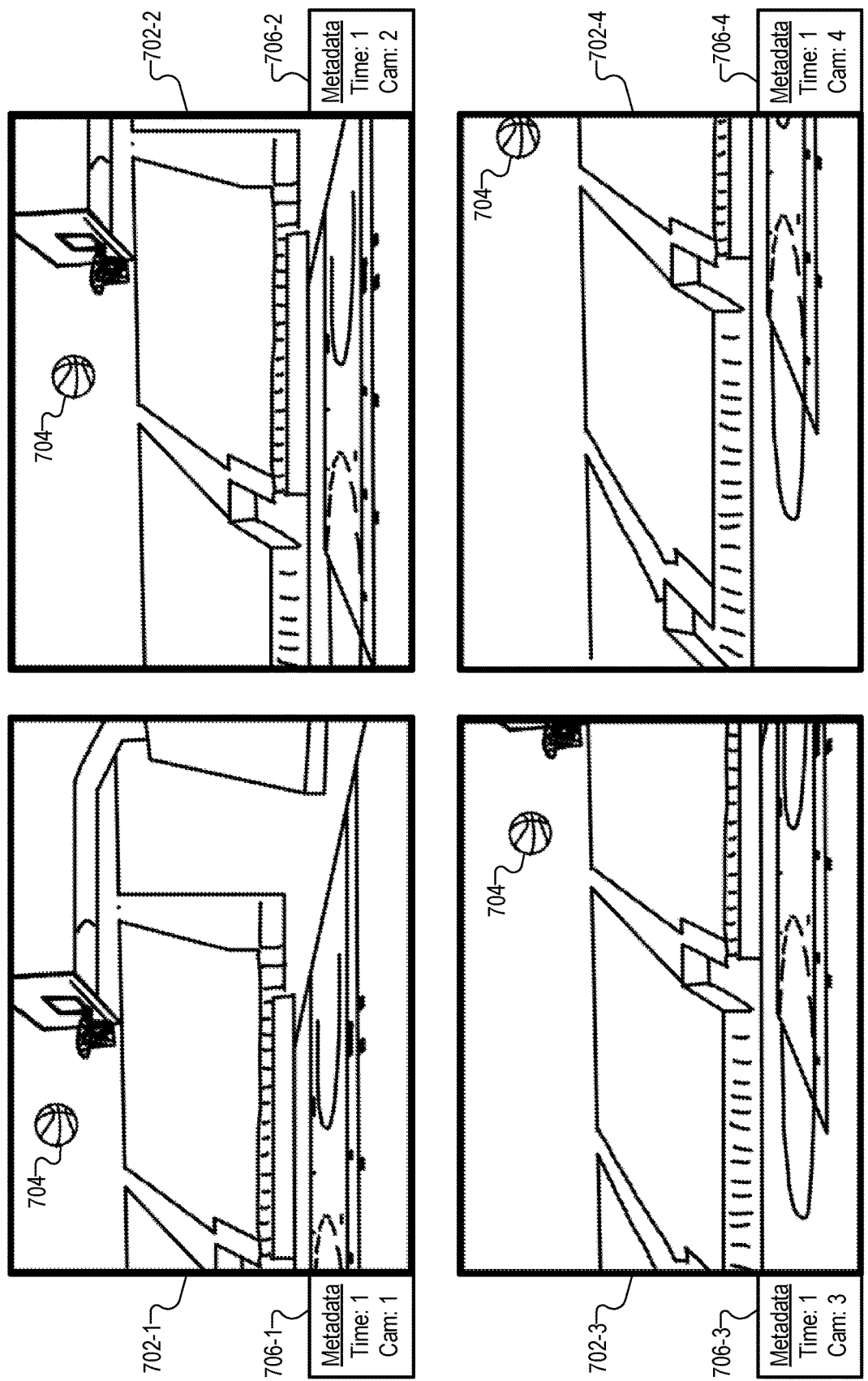
FIG. 7 shows an illustrative set of images concurrently captured by a plurality of different cameras at a particular point in time.

With these characteristics in mind, FIGS. 5-7 illustrate three different sets of images that may be accessed by system 100 and may implement images 402 in different scenarios or implementations. Specifically, FIG. 5 shows a scenario in which a set of images includes a series of image frames of a video sequence captured by a single camera at the scene during a period of time and the element of image content shown in the set of images to have the apparent movement comprises an object that is depicted in the series of image frames as the object undergoes a real movement during the period of time. FIG. 6 shows a scenario in which a set of images includes a series of image frames of a video sequence captured by a single camera at the scene during a period of time and the element of image content shown in the set of images to have the apparent movement comprises a stationary object or visual structure that is depicted in the series of image frames as the single camera undergoes a real movement during the period of time. FIG. 7 shows a scenario in which a set of images includes images concurrently captured at a particular point in time by a plurality of cameras arranged at the scene to have different vantage points and the element of image content shown in the set of images to have the apparent movement comprises an object or visual structure that is depicted to undergo a virtual movement as a result of the different vantage points from which the images are concurrently captured at the particular point in time. All of these illustrative image sets are relatively small (four images each) for the sake of explanatory clarity, but it will be understood that many images or a continuous stream of images may be included in certain image sets. Each of these sets of images (implementations of images 402) will now be described in more detail.

FIG. 5 shows an illustrative set of images 502 (e.g., images 502-1 through 502-4) depicting elements of image content including an object 504 undergoing a real movement with respect to the scene. More particularly, the elements of image content depicted in each of images 502 relate to a basketball stadium scene and include, from the example vantage point shown, a basketball standard (e.g., the backboard, rim, net, supporting pole, etc.), various lines drawn on the floor of the basketball court, spectator seating with rows of chairs and vertical aisles allowing movement of fans within the stadium, and so forth. While most of the image content is shown to be static from frame to frame in images 502, at least one element of the image content is shown to be moving with respect to the scene. Specifically, object 504 is shown to be a basketball rolling across the floor from a left side of the frame at image 502-1 toward the right side of the frame at image 502-4. It will be understood that various other objects, including living things such as people or animals, could also move across the scene in a similar way as the simple rolling basketball object 504 shown in FIG. 5.

Each of images 502 in FIG. 5 is also shown to be associated with a respective set of metadata 506 (e.g., metadata 506-1 with image 502-1, metadata 506-2 with image 502-2, etc.). As shown, metadata 506 may be associated (e.g., by image capture system 304) with each image 502 in the set of images and may be indicative of when each image 502 was captured and which camera 312, of the one or more cameras 312 at scene 314, captured the image 502. For instance, in the example of FIG. 5, metadata 506 shows that all of the images 502 were captured by the same camera (i.e., "Cam: 1") but that each image 502 was captured at a different time in a sequence of times (i.e., "Time: 1" for image 502-1, "Time: 2" for image 502-2, "Time: 3" for image 502-3, and "Time: 4" for image 502-4).

FIG. 6 shows an illustrative set of images 602 (e.g., images 602-1 through 602-4) captured by a single camera as the camera undergoes a real movement with respect to the scene. In this example, the same elements of image content described above in relation to FIG. 5 are shown in apparent movement from image 602 to image 602 due to the movement of the camera (e.g., panning the orientation of the camera to the left or having the location of the camera moved laterally to the left along the court). Most of the image content depicted in images 602 (e.g., the basketball standard, the lines on the floor of the basketball court, the spectator seating, etc.) is understood to remain stationary with respect to the scene over the period of time when images 602 are captured. However, as a result of the movement of the camera capturing these images, these elements of image content undergo apparent movement from image 602 to image 602 (i.e., appearing to move to the right as the camera moves to the left). Additionally, FIG. 6 also shows an object 604 implemented as a basketball moving toward the basketball standard and then falling out of frame (as if a shot was taken while the camera was moving). In this example, the apparent movement of object 604 is shown to be caused by both the real movement of the camera and by a real movement of the basketball object 604. In some cases, this movement may provide useful information that may be accounted for by the structure-from-motion algorithm along with the apparent movements of the stationary elements of image content. In other cases, the movement of object 604 while the camera vantage point is also moving may be considered less helpful and may be downplayed or ignored in favor of analyzing the apparent movements of the stationary elements of image content.

As with images 502 described above, each of images 602 in FIG. 6 is shown to be associated with a respective set of metadata 606 (e.g., metadata 606-1 with image 602-1, metadata 606-2 with image 602-2, etc.). As shown, metadata 606 may be associated (e.g., by image capture system 304) with each image 602 in the set of images and may be indicative of when each image 602 was captured and which camera 312, of the one or more cameras 312 at scene 314, captured the image 602. For instance, similar to images 502 in FIG. 5, metadata 606 shows that all of the images 602 in FIG. 6 were captured by the same camera (i.e., "Cam: 1") at different times in a sequence over a period of time (i.e., "Time: 1" for image 602-1, "Time: 2" for image 602-2, "Time: 3" for image 602-3, and "Time: 4" for image 602-4).

FIG. 7 shows an illustrative set of images 702 (e.g., images 702-1 through 702-4) concurrently captured by a plurality of different cameras at a particular point in time. In this example, the same elements of image content described above in relation to FIGS. 5 and 6 are shown in apparent movement from image 702 to image 702 due not to any real movement of the elements of image content (since the images are all captured simultaneously such that any movement would not be represented anyway), but, rather, due to a virtual movement resulting from the different vantage points of the different cameras capturing the images. As in FIG. 6, most of the image content depicted in images 702 (e.g., the basketball standard, the lines on the floor of the basketball court, the spectator seating, etc.) will be understood to remain stationary with respect to the scene, although a moving object 704 (a basketball understood to be en route to the basketball standard similar to object 604) is also shown in the air near the rim. Because all of images 702 are captured at a same moment in time, object 704 is suspended in the same location in the air with respect to the scene. However, as a consequence of the different vantage points of the cameras capturing images 702, the basketball object 704 is shown to undergo a virtual movement from image 702 to image 702 similar to the other elements of image content (i.e., appearing to move to the right as the camera vantage points move progressively to the left).

As with images 502 and 602 described above, each of images 702 in FIG. 7 is shown to be associated with a respective set of metadata 706 (e.g., metadata 706-1 with image 702-1, metadata 706-2 with image 702-2, etc.). As shown, metadata 706 may be associated (e.g., by image capture system 304) with each image 702 in the set of images and may be indicative of when each image 702 was captured and which camera 312, of the one or more cameras 312 at scene 314, captured the image 702. For instance, similar to images 502 in FIG. 5 and images 602 in FIG. 6, metadata 706 shows that all of the images 702 in FIG. 7 were captured concurrently at the same time (i.e., "Time: 1") by various different cameras with different vantage points (i.e., "Cam: 1" for image 702-1, "Cam: 2" for image 702-2, "Cam: 3" for image 702-3, and "Cam: 4" for image 702-4).

Returning to FIG. 4, the set of images 402 (which may be implemented by images 502, 602, 702, or other suitable images) may be accessed by system 100 so that structure-from-motion algorithm 404 may be applied to the images. For example, structure-from-motion algorithm 404 may be applied to a discrete set of images 402 (e.g., to initialize calibration parameters 414) and/or may be applied repeatedly to multiple sets of images 402 (e.g., to refine and update calibration parameters 414) as such images 402 are continuously streamed from image capture system 304. By continuing to refine and optimize a scene registration based on new images 402, calibration parameters 414 based on this scene registration may become progressively more precise and accurate and may automatically self-correct in the event that changes are made to the scene registration (e.g., when cameras are moved to new locations or reoriented, etc.). Each of the operations of structure-from-motion algorithm 404 will now be described in more detail.

At operation 406, structure-from-motion algorithm 404 directs system 100 to detect a set of corresponding features for various pairs of images 402 from the set of images 402 that is accessed. To this end, system 100 may first perform a feature extraction algorithm on both images in the pair, then match similar features and patterns of features between the images to identify areas of overlap.

Figure 8:
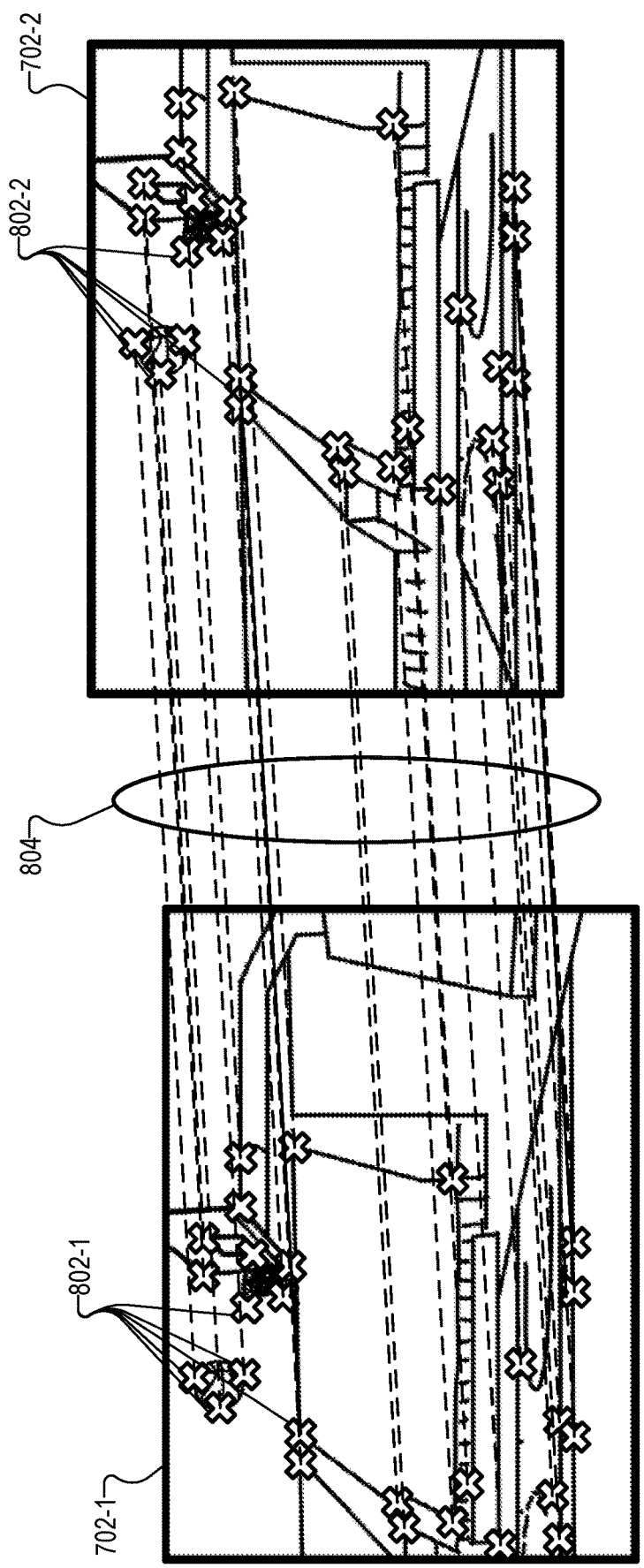
FIG. 8 shows an illustrative set of corresponding features detected for a pair of images.

To illustrate, FIG. 8 shows example aspects of how a set of corresponding features is detected for a particular pair of images 402. Specifically, as shown for this example, the pair of images presented in FIG. 8 includes image 702-1 and 702-2, which were previously shown and described in relation to FIG. 7. For each image, operation 406 involves extracting various features (e.g., edges, corners, ridges, regions of interest points ("blobs"), etc.) for each of the two images, then comparing these features to match (e.g., find correspondences between) features from each image. For example, a few features 802 identified within each of images 702-1 and 702-2 are illustrated in FIG. 8 by white 'X's (e.g., features 802-1 in image 702-1 and features 802-2 in image 702-2). The correspondences 804 detected between these features are illustrated by dotted lines extending between corresponding features in the two images. (Note that the images are slightly offset in FIG. 8 in order to cause these dotted lines to slope in a manner that makes them easier to see in the illustration.) While each feature 802-1 in image 702-1 is shown to be matched to a corresponding feature 802-2 in image 702-2 in FIG. 8, it will be understood that, in certain implementations, many more features than are explicitly shown may be extracted for each image, and that many identified features may not be matched to a corresponding feature in the paired image (e.g., particularly in areas where the images do not even overlap).

The feature extraction and feature correspondence matching of operation 406 may be performed using any suitable techniques, algorithms, or technologies as may serve a particular implementation. For example, a scale-invariant feature transform (SIFT) algorithm, a speeded up robust features (SURF) algorithm, an oriented FAST and rotated BRIEF (ORB) algorithm, or another such approach may be employed. While these established techniques may be advantageous for their stability and reliability, certain implementations may also employ more sophisticated approaches such as techniques involving machine learning, trained deep neural networks, statistical surveys, and/or other advanced technologies and information. For example, Super Points, repeatable and reliable detector and descriptor (R2D2), or other such technologies may be used in some implementations and/or scenarios.

While certain implementations of structure-from-motion algorithm 404 may employ a single feature extraction/ correspondence algorithm for performing operation 406, other implementations may support a variety of such algorithms to be used in different scenarios or under different conditions as circumstances may call for. In such implementations, the detecting of the set of corresponding features for the pair of images at operation 406 may be performed using a particular feature extraction algorithm selected from a plurality of supported feature extraction algorithms. For example, the particular feature extraction algorithm may be selected for use in detecting the set of corresponding features based on one or more conditions under which the set of images is captured. These conditions may include lighting conditions, the number of cameras used to record a scene, the density of camera placement (or other aspects of how the cameras are arranged), or other suitable conditions.

In certain scenarios, system 100 may begin applying structure-from-motion algorithm 404 without any knowledge of the scene geometry or the placement or pose of any cameras 312 capturing images 402. Accordingly, at least during an initial phase, the pairing of images 402 (e.g., including the selection of images 702-1 and 702-2 to compare for the example of FIG. 8) may be performed randomly or in some other arbitrary way until confidence can be developed that the images captured by certain cameras are likely to overlap with images captured by other cameras (making it likely that these cameras are near one another or otherwise have related vantage points). For example, if images 402 are implemented by images 702 described above, image 702-1 may be randomly paired with each of the other three images 702-2 through 702-4 and analyzed to find corresponding features. Assuming that this analysis results in a greater number of corresponding features between images 702-1 and 702-2 than, for example, images 702-1 and 702-4, system 100 may determine that the camera capturing image 702-1 ("Cam: 1") is more directly related to (e.g., more proximate, etc.) the camera capturing image 702-2 ("Cam: 2") than it is to the camera capturing image 702-4 ("Cam: 4"), and this may be accounted for when pairing and comparing images 402 accessed later. For cameras with little or no overlap on the image content they are capturing (e.g., cameras across the scene from one another that are facing in opposite directions, etc.), the images they capture may eventually be paired rarely or not at all due to the absence of overlap. Rather, the relationship between these cameras would likely be determined indirectly, as a result of the relationships of each of these cameras with other cameras that capture more overlap with them and are registered to the same world coordinate system (as described in more detail below).

Returning to FIG. 4, at operation 408, structure-from-motion algorithm 404 directs system 100 to determine a geometric relationship for each of the pairs of images based on the respective sets of corresponding features for each pair of images that were detected at operation 406. To this end, structure-from-motion algorithm 404 may run exhaustive search and/or optimization algorithms on the image pairs in order to find overlapping and corresponding areas between images. The feature correspondences previously found at operation 406 may be used as a result of their having geometrically consistent characteristics. Based on the positional configuration of a particular image pair, various matrices (e.g., an H matrix, an E matrix, an F matrix, etc.) may be generated that map points in one image to another image in a one-to-one manner while satisfying predetermined ground rules. In this way, feature correspondence and overlap between images identified as part of operation 406 may be verified, validated, cleaned up, and/or otherwise optimized (e.g., including dropping outlier points, etc.).

Any suitable techniques or technologies may be used at operation 408 to define the geometric relationships that different cameras or vantage points may have. For example, a random sample consensus (RANSAC) algorithm or another iterative method may be used to estimate parameters of a mathematical model from a set of observed data that contains outliers to remove the outliers and establish epipolar lines of a stereo system between the two images. Other techniques and algorithms to establish correspondence may also be used as may serve a particular implementation, and, as with feature detection, different circumstances may call for different techniques or algorithms to be employed in certain implementations.

At operation 410, structure-from-motion algorithm 404 directs system 100 to construct a scene registration based on the geometric relationships for the various pairs of images determined at operation 408. The scene registration may define poses (e.g., spatial positions and orientations) for each camera with respect to the scene (i.e., with respect to a world coordinate system associated with the scene) so as to be configured for use in generating calibration parameters 414 for the one or more cameras. The scene registration may also define poses, with respect to the scene, of various objects and/or other elements of image content present at the scene. To this end, structure-from-motion algorithm 404 may estimate rotation and translation (R|T) matrices representing the relationship between each camera and the world coordinate system. For initialization of the scene registration, operation 410 may be configured to operate on image pairs selected for having the best-established feature correspondence. Based on feature correspondence that has already been established, system 100 may determine the camera poses at least to within a certain threshold (e.g., such that 2D-3D projections fall below a predetermined error threshold). In certain implementations, the scene registration constructed at operation 410 may define camera poses that are relatively rough estimates of the actual camera poses. However, this scene registration may be considered to be successful for the purposes of operation 410 when the estimated R|T matrices show error results for 2D-3D reprojections that meet an error threshold (e.g., a threshold that may be set to a relatively permissive value due to the refinements and optimizations that will be performed later).

At operation 412, structure-from-motion algorithm 404 directs system 100 to iteratively adjust the scene registration constructed (e.g., initialized and generated at least to a within the relatively permissive threshold described above) at operation 410. More particularly, operation 412 may involve a bundle adjustment or other iterative process that optimizes the scene registration in accordance with one or more optimization parameters. For example, the sum of errors between the measured pixel coordinates and their true positions may be used to measure the success of a particular approximation and various values may be altered and reevaluated in order to minimize the error of hypothesized camera models. In some examples, the values adjustments may be performed in a loop that either converges to a desired minimum value (e.g., to satisfy a more exacting threshold than was employed for the initialization of the scene registration at operation 410) or continues until a predetermined maximum number of iterations has been performed.

As mentioned above, once camera poses have been estimated based on a particular set of features extracted from images captured by the cameras, reprojections from 2D to 3D (2D-3D reprojections) and/or reprojections from 3D to 2D (3D-2D reprojections) may be performed to test and validate how accurate the estimated camera poses are with respect to the scene. Because adjusting the estimate for one pose of one camera may affect estimates for other poses of other cameras, an iterative process such as a bundle adjustment may be performed to ideally make smaller and smaller optimizations as the total error for the entire scene registration decreases. For example, by starting with the best-understood pairs of cameras and working toward the pairs of cameras with less confident feature correspondence, the error may be progressively minimized in accordance with established numerical optimization operations.

As the scene registration is optimized (e.g., as part of a closed or discrete process or, in certain examples, as part of an open-ended or continuous process that continues iterating to minimize the error in the registration models as new image data continues to be captured), operation 412 may express the scene registration as a set of transformations (e.g., in the form of rotation, translation, and distortion matrices) describing images and elements of image content within the world coordinate system.

Based on these transformations, and as a result of applying structure-from-motion algorithm 404 to images 402, system 100 may output any calibration parameters 414 as may serve a particular implementation. As shown, for example, calibration parameters 414 generated by the applying of structure-from-motion algorithm 404 may include intrinsic parameters 416 for each camera of the one or more cameras 312. Intrinsic parameters 416 may be indicative of any internal characteristics of cameras 312 that may influence the way that image content is captured by the cameras. For instance, intrinsic parameters may indicate focal length, skew, distortion, image center, and so forth, for each camera 312 so as to help mitigate or correct for lens distortion and/or other unwanted artifacts of image capture. In some examples, intrinsic parameters 416 may include a respective remapping matrix for each particular camera 312, where the remapping matrices are each configured for use in correcting distortion introduced into images 402 captured by that particular camera 312. For example, the remapping matrix may include respective values for each pixel captured by the image sensor of a particular camera 312 to help 3D modeling system 306 undistort and/or rectify (if necessary) that pixel. Intrinsic parameters 416 may be determined based on the application of structure-from-motion algorithm 404 to images 402 for configurations involving a single camera, as well as for configurations (such as configuration 300) that involve a plurality of cameras 312.

As further shown in FIG. 4, for a setup like configuration 300 in which the set of images 402 is captured by a plurality of cameras 312 arranged at a scene at different poses, calibration parameters 414 generated by the applying of structure-from-motion algorithm 404 may also include extrinsic parameters 418 for each of the plurality of cameras 312. Extrinsic parameters 418 may be indicative of respective poses (e.g., positions and/or orientations) of cameras 312 with respect to the scene. For instance, extrinsic parameters 418 may represent respective camera pose matrices indicative of the different poses of the plurality of cameras 312 with respect to a world coordinate system associated with the scene. In this way, when 3D modeling system 306 accounts for extrinsic parameters 418 provided by system 100, the same features captured by different cameras 312 may be properly correlated and aligned in the world coordinate space to facilitate the efficient generation of accurate 3D models.

Figure 9:
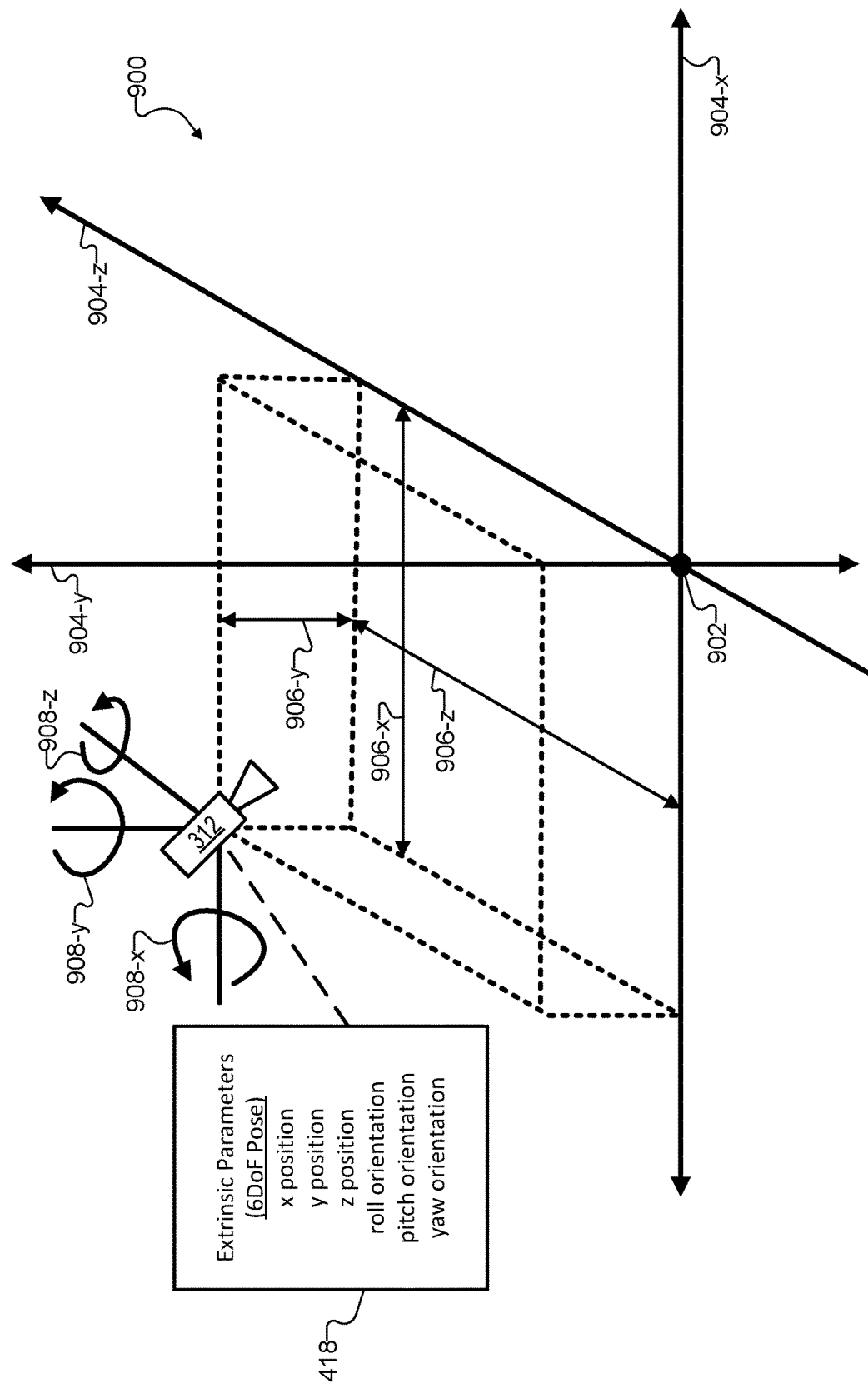
FIG. 9 shows illustrative aspects of a pose of a camera represented by extrinsic calibration parameters generated by a camera calibration system.

To illustrate the world coordinate space and the camera pose matrix that may be generated for one particular camera 312, FIG. 9 shows illustrative aspects of a pose of a camera 312 represented by extrinsic calibration parameters generated by system 100. As shown, a world coordinate system 900 includes an origin 902 that may be positioned at a particular location in scene 314 (e.g., at the center of the basketball court in the basketball-related examples illustrated above, etc.) or associated with one particular camera 312. Extending from origin 902, world coordinate system 900 is also shown to include three orthogonal axes labeled axis 904-x (the x-axis), axis 904-y (the y-axis), and axis 904-z (the z-axis). A particular camera 312 is shown to be posed at a particular location and to have a particular orientation in world coordinate system 900. Specifically, as shown, the position of this camera 312 is at a point defined by distances 906-x, 906-y, and 906-z along each of the three axes. The orientation of this camera 312 is defined by rotational parameters 908-x (for roll), 908-y (for pitch), and 908-z (for yaw). Accordingly, a matrix representing six degrees of freedom (6DoF) of the pose of this camera 312 may be generated as part of the extrinsic parameters 418 for this particular camera 312. Specifically, as shown, the "Extrinsic Parameters" for the particular "6DoF Pose" of this camera 312 may include an "x position" (associated with distance 906-x), a "y position" (associated with distance 906-y), a "z position" (associated with distance 906-z), a "roll orientation" (associated with rotational parameter 908-x), a "pitch orientation" (associated with rotational parameter 908-y), and a "yaw orientation" (associated with rotational parameter 908-z).

While only a single camera 312 is illustrated in FIG. 9 for clarity of illustration, it will be understood that each of a plurality of cameras 312 may be similarly represented by their own set of extrinsic parameters (e.g., a 6DoF matrix or other suitable representation that indicates in terms of linear algebra the relationship between scene, camera, and image acquisition process) referencing the same world coordinate system 900 as shown in FIG. 9 for this particular camera 312. In other words, system 100 may output a set of extrinsic parameters 418 similar to those shown in FIG. 9 for each camera 312 used in a given configuration. As has been mentioned, certain implementations may continuously refine and/or update calibration parameters 414 as more images are captured and more data becomes available.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
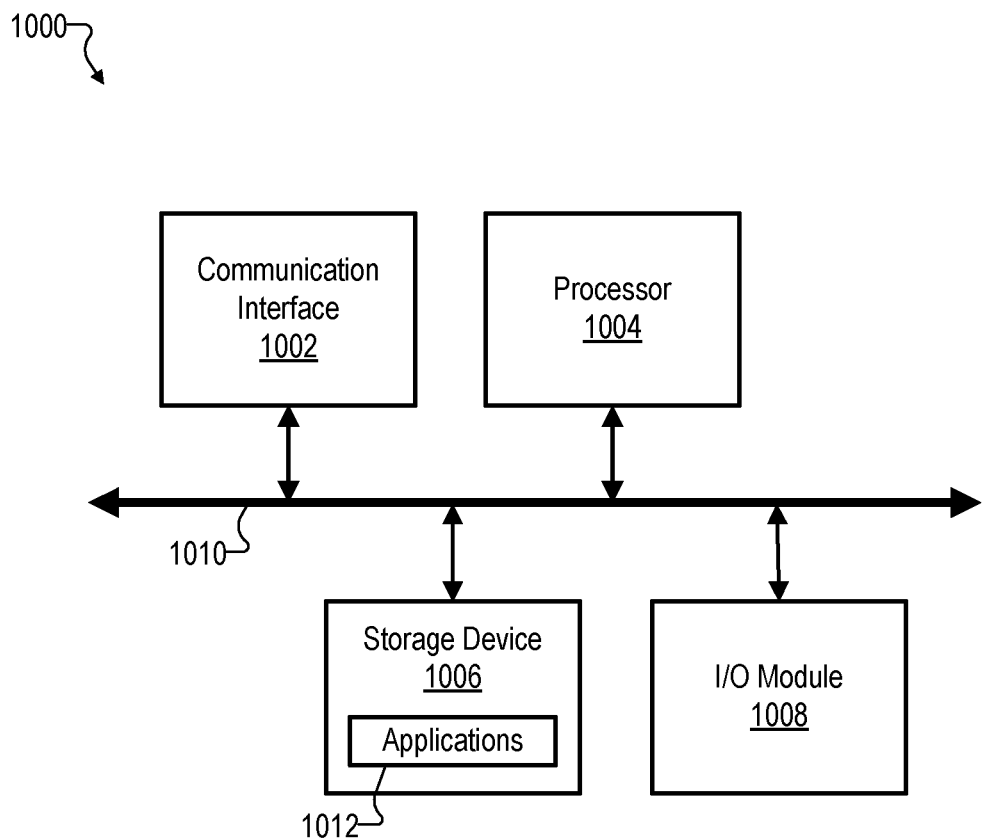
FIG. 10 shows an illustrative computing device that may implement camera calibration systems and/or other computing systems described herein.

FIG. 10 shows an illustrative computing device 1000 that may implement camera calibration systems and/or other computing systems described herein. For example, computing device 1000 may include or implement (or partially implement) a camera calibration system 100, an image capture system such as image capture system 304, a 3D modeling system such as 3D modeling system 306, an end-user device such as media player device 308, certain elements of network 302 and/or cameras 312, and/or any other computing devices or systems described herein, or any elements or subsystems thereof.

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    accessing, by a camera calibration system including one or more processors, a set of images concurrently captured at a particular point in time at a scene by a plurality of cameras arranged at the scene to have different vantage points, the set of images each depicting a same element of image content present at the scene, wherein the element of image content is depicted differently in each image of the set of images so as to show an apparent movement of the element from one image to another as a result of the different vantage points;
    applying, by the camera calibration system to the set of images, a structure-from-motion algorithm to generate calibration parameters for the plurality of cameras based on the apparent movement of the element of image content shown in the set of images;
    providing, by the camera calibration system to a 3D modeling system configured to generate a model of the scene based on the set of images, the calibration parameters for the plurality of cameras;
    applying, by the camera calibration system based on an event at a later point in time that may affect the calibration parameters, the structure-from-motion algorithm to update the calibration parameters for the plurality of cameras based on an additional set of images concurrently captured at the later point in time by the plurality of cameras and indicating a change in pose of the element of the image content at the later point in time from the set of images; and
    providing, by the camera calibration system to the 3D modeling system further configured to update the model based on the additional set of images, the updated calibration parameters for the plurality of cameras.

2. The method of claim 1, wherein the applying of the structure-from-motion algorithm to the set of images includes:
    detecting a set of corresponding features for a pair of images from the set of images;
    determining, based on the set of corresponding features for the pair of images, a geometric relationship for the pair of images; and
    constructing, based on the geometric relationship for the pair of images, a scene registration configured for use in generating the calibration parameters for the plurality of cameras, the scene registration defining poses, with respect to a world coordinate system, of the plurality of cameras and the element of image content present at the scene.

3. The method of claim 2, wherein the applying of the structure-from-motion algorithm to the set of images further includes iteratively adjusting the scene registration in accordance with an optimization parameter.

4. The method of claim 2, wherein:
    the detecting of the set of corresponding features for the pair of images is performed using a particular feature extraction algorithm selected from a plurality of supported feature extraction algorithms; and
    the particular feature extraction algorithm is selected for use in detecting the set of corresponding features based on one or more conditions under which the set of images is captured.

5. The method of claim 1, wherein the calibration parameters generated by the applying of the structure-from-motion algorithm include intrinsic parameters for a particular camera of the plurality of cameras, the intrinsic parameters representing a remapping matrix configured for use in correcting distortion introduced into images captured by the particular camera.

6. The method of claim 1, wherein:
    the calibration parameters generated by the applying of the structure-from-motion algorithm include extrinsic parameters for the plurality of cameras, the extrinsic parameters representing respective camera pose matrices indicative of the different poses of the plurality of cameras with respect to a world coordinate system.

7. The method of claim 1, wherein the element of image content shown in the set of images to have the apparent movement comprises a living human or animal subject that moves with respect to the scene.

8. The method of claim 1, wherein:
    the scene is associated with an event venue that includes a stage area where activities associated with an event are performed; and
    the element of image content shown in the set of images to have the apparent movement comprises an object or visual structure within the event venue that is stationary with respect to the stage area as the activities associated with the event are performed.

9. The method of claim 1, wherein the providing the calibration parameters to the 3D modeling system comprises providing the calibration parameters to an image capture system, wherein the image capture system is configured to adjust the set of images based on the calibration parameters and provide the calibration parameters to the 3D modeling system.

10. A system comprising:
a memory storing instructions; and
a processor communicatively coupled to the memory and configured to execute the instructions to:
  access a set of images concurrently captured at a particular point in time at a scene by a plurality of cameras arranged at the scene to have different vantage points, the set of images each depicting a same element of image content present at the scene, wherein the element of image content is depicted differently in each image of the set of images so as to show an apparent movement of the element from one image to another as a result of the different vantage points;
  apply, to the set of images, a structure-from-motion algorithm to generate calibration parameters for the plurality of cameras based on the apparent movement of the element of image content shown in the set of images;
  provide, to a 3D modeling system configured to generate a model of the scene based on the set of images, the calibration parameters for the plurality of cameras;
  apply, based on an event at a later point in time that may affect the calibration parameters, the structure-from-motion algorithm to update the calibration parameters for the plurality of cameras based on an additional set of images concurrently captured at the later point in time by the plurality of cameras and indicating a change in pose of the element of the image content at the later point in time from the set of images; and
  provide, to the 3D modeling system further configured to update the model based on the additional set of images, the updated calibration parameters for the plurality of cameras.

11. The system of claim 10, wherein the applying of the structure-from-motion algorithm to the set of images includes:
detecting a set of corresponding features for a pair of images from the set of images;
determining, based on the set of corresponding features for the pair of images, a geometric relationship for the pair of images; and
constructing, based on the geometric relationship for the pair of images, a scene registration configured for use in generating the calibration parameters for the plurality of cameras, the scene registration defining poses, with respect to a world coordinate system, of the plurality of cameras and the element of image content present at the scene.

12. The system of claim 11, wherein the applying of the structure-from-motion algorithm to the set of images further includes iteratively adjusting the scene registration in accordance with an optimization parameter.

13. The system of claim 10, wherein the calibration parameters generated by the applying of the structure-from-motion algorithm include intrinsic parameters for a particular camera of the plurality of cameras, the intrinsic parameters representing a remapping matrix configured for use in correcting distortion introduced into images captured by the particular camera.

14. The system of claim 10, wherein:
the calibration parameters generated by the applying of the structure-from-motion algorithm include extrinsic parameters for the plurality of cameras, the extrinsic parameters representing respective camera pose matrices indicative of the different poses of the plurality of cameras with respect to a world coordinate system.

15. The system of claim 10, wherein the providing the calibration parameters to the 3D modeling system comprises providing the calibration parameters to an image capture system, wherein the image capture system is configured to adjust the set of images based on the calibration parameters and provide the calibration parameters to the 3D modeling system.

16. A non-transitory computer-readable medium storing instructions that, when executed, direct a processor of a computing device to:
access a set of images concurrently captured at a particular point in time at a scene by a plurality of cameras arranged at the scene to have different vantage points, the set of images each depicting a same element of image content present at the scene, wherein the element of image content is depicted differently in each image of the set of images so as to show an apparent movement of the element from one image to another as a result of the different vantage points;
apply, to the set of images, a structure-from-motion algorithm to generate calibration parameters for the plurality of cameras based on the apparent movement of the element of image content shown in the set of images;
provide, to a 3D modeling system configured to generate a model of the scene based on the set of images, the calibration parameters for the plurality of cameras;
apply, based on an event at a later point in time that may affect the calibration parameters, the structure-from-motion algorithm to update the calibration parameters for the plurality of cameras based on an additional set of images concurrently captured at the later point in time by the plurality of cameras and indicating a change in pose of the element of the image content at the later point in time from the set of images;
provide, to the 3D modeling system further configured to update the model based on the additional set of images, the updated calibration parameters for the plurality of cameras.

17. The non-transitory computer-readable medium of claim 16, wherein the applying of the structure-from-motion algorithm to the set of images includes:
detecting a set of corresponding features for a pair of images from the set of images;
determining, based on the set of corresponding features for the pair of images, a geometric relationship for the pair of images;
constructing, based on the geometric relationship for the pair of images, a scene registration configured for use in generating the calibration parameters for the plurality of cameras, the scene registration defining poses, with respect to a world coordinate system, of the plurality of cameras and the element of image content present at the scene; and
iteratively adjusting the scene registration in accordance with an optimization parameter.

18. The non-transitory computer-readable medium of claim 16, wherein the providing the calibration parameters to the 3D modeling system comprises providing the calibration parameters to an image capture system, wherein the image capture system is configured to adjust the set of images based on the calibration parameters and provide the calibration parameters to the 3D modeling system.

* * * * *